US006591054B2

(12) United States Patent
Afflerbaugh et al.

(10) Patent No.: US 6,591,054 B2
(45) Date of Patent: Jul. 8, 2003

(54) FILAMENT ORGANIZER WITH ACCESSORY POSITIONER

(75) Inventors: Martin G. Afflerbaugh, Austin, TX (US); Bryon J. Cronk, Round Rock, TX (US); Patrick Charles Howard, Austin, TX (US); Gordon Wiegand, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 105 days.

(21) Appl. No.: 09/827,043

(22) Filed: Apr. 5, 2001

(65) Prior Publication Data

US 2002/0146228 A1 Oct. 10, 2002

(51) Int. Cl.[7] ................................................. G02B 6/00
(52) U.S. Cl. .................... 385/135; 385/37; 385/134; 385/136; 385/137; 385/59
(58) Field of Search .................... 385/135, 37, 134, 385/136, 137, 59

(56) References Cited

U.S. PATENT DOCUMENTS

| | | | | |
|---|---|---|---|---|
| 4,792,203 A | * | 12/1988 | Nelson et al. ............... | 385/135 |
| 4,840,449 A | * | 6/1989 | Ghandeharizadeh ........ | 385/135 |
| 5,042,898 A | | 8/1991 | Morey et al. .................. | 388/37 |
| 5,956,450 A | | 9/1999 | Stieb et al. | |
| 5,970,749 A | | 10/1999 | Bloom | |
| 5,991,483 A | | 11/1999 | Engelberth .................... | 385/37 |
| 6,101,301 A | | 8/2000 | Engelberth et al. ........... | 385/37 |

FOREIGN PATENT DOCUMENTS

| | | | |
|---|---|---|---|
| EP | 1035425 A1 | 9/2000 | |
| WO | WP 98/59267 | 12/1998 | ............ G02B/5/18 |
| WO | WO 00/58769 | 10/2000 | |
| WO | WO 02/073273 A1 | 9/2002 | |

OTHER PUBLICATIONS

Abstract of JP 9211348–Wavelength Varying Type Optical Filter–has flexible piezoelectric transducer attached in–between support members which is fixed to optical fibre.
International Search Report for PCT/US01/21891.

* cited by examiner

Primary Examiner—Robert H. Kim
Assistant Examiner—George Wang
(74) Attorney, Agent, or Firm—Alan Ball

(57) ABSTRACT

A filament organizer, for attaching an accessory to a section of filament, comprises a frame including a plurality of filament guides. The frame accommodates an accessory positioner adapted for sliding engagement therewith. A pair of spools, attached to the accessory positioner, has a section of filament extending from one to the other so that the filament passes around the plurality of filament guides of the frame to selectively position the section of filament. The accessory positioner includes an accessory cradle that moves from a retracted position to a proximate position. In its retracted position the accessory cradle receives an accessory to be placed in axial alignment with the section of filament. The accessory cradle then moves into the proximate position to attach the accessory to the filament section. Preferably, the filament is an optical fiber that includes a refractive index grating, and the accessory provides temperature compensation to stabilize the wavelength and facilitate wavelength tuning of the grating.

17 Claims, 8 Drawing Sheets

FILAMENT ORGANIZER WITH ACCESSORY POSITIONER

FIELD OF THE INVENTION

The invention relates to an article used as a filament storage device to facilitate filament positioning during modification of a filament. More particularly the invention provides a filament organizer including a detachable positioner for conveniently handling an accessory to be attached to a filament, especially an optical fiber to produce a functional optical device. Such a device includes a temperature compensated optical fiber Bragg grating that may be precisely tuned to a prescribed wavelength using a tuning apparatus according to the present invention.

BACKGROUND OF THE INVENTION

Technological advancements, particularly in telecommunications, have caused a migration from systems and devices based upon electronics to those that integrate electronics with optics. These systems and related devices are known collectively as optoelectronics. The movement of signals using photons instead of electrons provides advantages of speed, information-carrying capability, immunity from interference, lower cost, and higher reliability.

Growth of optoelectronic systems occurs as phone companies increasingly promote the use of fiber-optic cable and related devices for developing ever-expanding telecommunications networks. Success in telecommunications markets has produced a demand for innovations in fiber-optic technology. Increasing demand for products typically translates into a need to accelerate the output rate and assembly of products and systems desired by consumers. Acceleration of output rates depends upon efficiency in manufacturing operations, usually through process automation.

Methods used currently for assembly and testing of optoelectronic systems and devices are largely manual and time consuming. This applies particularly to processes for introducing special features such as periodic refractive index gratings into optical fibers. Formation of a refractive index grating, or Bragg grating, into an optical fiber requires a number of steps for manually handling lengths of optical fiber during a series of manufacturing operations.

A optical fiber Bragg grating provides a periodic variation of refractive index within a length of an optical fiber. The grating may be formed or written during exposure of a photosensitive optical fiber to an appropriate pattern of ultraviolet radiation. Applications for Bragg gratings exist in telecommunications systems to control the wavelength of laser light, to introduce dispersion compensation, for example. The characteristics of Bragg gratings change with changes of strain and temperature. A change in temperature will change the wavelength of light transmitted via a Bragg grating, with undesirable consequences. One solution to this problem is the use of a temperature compensating structure attached to the portion of an optical fiber containing the Bragg grating. This is usually accomplished by clamping a Bragg grating containing optical fiber, under tension, into a mechanical structure combining a low expansion material with a high expansion material. This method of passive temperature compensation is well known as a means for improving wavelength stability of optical fiber Bragg gratings. U.S. Pat. No. 5,042,898 discloses an apparatus for temperature compensation of a fiber Bragg grating comprising two juxtaposed compensating members with the required differences in thermal expansion. The apparatus applies either tensile or compressive stress to the grating. Other references addressing temperature compensation of optical fiber Bragg gratings, using fiber length variation, include United States Patents U.S. Pat. No. 5,991,483, U.S. Pat. No. 6,101,301 and WIPO publication WO 98/59267. Japanese publication JP 9211348 describes the use of a piezoelectric transducer to modulate the strain in a fiber in response to electrical signals. Such devices are effective but costly.

Temperature compensated optical fiber Bragg grating packages, as previously discussed, are typically large, exhibiting variation of reflection wavelength from one package to another. In some cases, the design of temperature compensating structures is complex requiring multiple points of connection to form a package having a negative coefficient of thermal expansion. Some temperature compensated packages include fine adjustment of the grating wavelength but this may involve complicated procedures such as the extension or compression of the total package as described in WO 98/59267.

Regardless of the availability of solutions for compensating the temperature drift of optical fiber Bragg gratings, little has been revealed for automating processes either for forming Bragg gratings or attaching structures or accessories to optical fibers to perform a desired function such as temperature compensation. With increasing demand for optoelectronic systems there is a need to improve optical fiber handling to achieve more cost effective production of large quantities of optical fiber devices.

SUMMARY OF THE INVENTION

The present invention satisfies the need for effective and compact handling of filamentary materials during manufacturing operations including process steps that include attaching accessories to a filament and producing structural and related changes in the filament. When applied to optical fibers, an article, also described herein as a filament organizer, provides compact containment of an optical fiber during the writing of an optical fiber Bragg grating and further processing to provide a temperature compensated optical fiber Bragg grating package. Preferably the filament organizer includes a detachable accessory positioner. The filament organizer allows relatively precise positioning of at least a section of optical fiber to facilitate attachment of accessories, such as thermal compensators, held temporarily in an accessory cradle of an accessory positioner.

An accessory positioner, adapted for variable positioning in a filament organizer, conveniently allows placement of an accessory in the accessory cradle when there is a spaced relationship between the accessory positioner and a filament, preferably an optical fiber. Using suitable means to move the accessory positioner in the filament organizer, an accessory may be moved towards a filament with precise alignment of the two before joining them together. Means to facilitate movement of an accessory positioner between positions include sliding motion on e.g. racks, or tracks or movement based upon the use of bearings, bars, hinges, cams and the like.

A filament organizer according to the present invention may be used to assemble filamentary devices, particularly devices including optical fibers. An example of such use involves either changing the inherent characteristics of an optical fiber or incorporating an optical fiber into a functional assembly. The inherent characteristics of an optical fiber change with adjustment of its refractive index properties, as in the formation of a variety of fiber Bragg gratings. Incorporation of an optical fiber into a functional assembly provides useful devices such as temperature compensated fiber Bragg gratings. Refractive index changes and functional assembly production, according to the present invention, use a filament organizer during the formation of a temperature compensated optical fiber Bragg grating. Thereafter an optical fiber Bragg grating may be precisely tuned using an accessory positioner with a tuning jig according to the present invention.

More particularly, the present invention provides a filament organizer for attaching an accessory to a section of filament. The filament organizer comprises a frame including a plurality of guides. Also, the filament organizer includes an accessory positioner adapted for sliding engagement with the frame between a first position and a second position. The accessory positioner includes a first spool and a second spool having a filament extended between them to pass around the guides. This locates the section of filament for attachment of an accessory. An accessory cradle, included with the accessory positioner, receives an accessory in the first position to transport it to the second position from which the accessory is attached to the section of filament.

An accessory positioner according to the present invention preferably comprises a support having a forward edge and a first surface opposite a second surface. The support further includes a first hub having separation from a second hub. A first spool, engaging the first hub, is mounted for rotation on the support. The accessory positioner also includes a second spool, engaging the second hub, mounted for rotation on the support. A separation exists from the first spool to the second spool for suspension of a section of filament between the two to locate the section of filament before attaching an accessory to the filament. The accessory positioner further has an accessory cradle to receive an accessory to be attached to the section of filament.

A preferred embodiment of an accessory positioner may be used for attaching an accessory to a section of a filament when the accessory positioner is mounted in a substantially rectangular frame that includes a plurality of forward guides and a plurality of rear guides. In this case the accessory positioner moves in sliding engagement with the frame. The movable accessory positioner has a first surface opposite a second surface, a front edge and a rear edge. A first spool occupies a position adjacent to the first surface, between the front edge and the rear edge. A second spool also lies adjacent to the first surface between the front edge and the rear edge. The use of a filament restrictor transmits a force to each of the first spool and the second spool to apply tension to a filament extended therebetween. The filament passes around the rear guides and the forward guides to locate a section of filament between the forward guides. A movable accessory positioner also has an accessory cradle at its front edge to move from a retracted position to a proximate position relative to a filament. The accessory cradle, in the retracted position receives a accessory for placement in axial alignment with the section of filament when the accessory cradle moves into the proximate position to attach the accessory to the section of filament.

Accessory attachment according to the present invention preferably uses an attachment fixture for arranging at least one filament organizer for attaching an accessory to a filament. The attachment fixture comprises a base plate that includes at least one organizer slot and has a first end and a second end. A first support is secured to the first end of the base plate and a second support is secured to the second end of the base plate. At least one rod extends between the first support and the second support so that the rod contacts a filament organizer positioned in an organizer slot.

A Bragg grating may be tested or optically proofed according to the present invention using an optical proofing fixture for arranging a plurality of accessory positioners for organizing optical fiber pigtail ends to monitor light passing between the pigtail ends. The optical proofing fixture comprises a first faceplate, and a second faceplate. At least one support bar connects the first faceplate to the second faceplate. Each of a plurality of pigtail mounts, coupled between the first faceplate and the second faceplate, includes a resilient grip having a grip retention slit to releasably retain pigtail ends of an optical fiber. The optical proofing fixture further includes a flange connected between the first faceplate and the second faceplate.

The present invention includes a tuning apparatus for precise adjustment of the wavelength of a refractive index grating, formed in a section of optical fiber. The tuning apparatus comprises a pair of spaced-apart cantilever arms having the section of optical fiber suspended between them. A clamp immobilizes the section of optical fiber to allow a tuning blade to apply force to at least one of the pair of cantilever arms. An actuator connected to the tuning blade has a controller for moving the tuning blade under a prescribed force and distance causing displacement of the cantilever arm. This increases the separation between the pair of cantilever arms, thereby changing the length of the section of optical fiber and adjusting the wavelength of a refractive index grating formed in the optical fiber.

The present invention further includes a process for attaching an accessory to a filament, preferably in the form of an optical fiber. The process comprises the steps of providing a filament held in a filament organizer. A filament organizer comprises a frame including a plurality of guides and an accessory positioner mounted on the frame for movement between a first position and a second position. The accessory positioner includes a first spool and a second spool having a filament extended between them to pass around the guides to locate a section of filament for attachment of an accessory. The accessory positioner further has an accessory cradle to receive the accessory, in the first position, for transportation of the accessory to the second position for attachment to the section of filament. An accessory may be placed in the accessory cradle when the accessory positioner is in the first position. The accessory has a pair of spaced apart cantilever arms, each including a contact point. Moving the accessory positioner into the second position places the section of filament adjacent to the accessory to contact the contact points for bonding the accessory to the section of filament at each of the contact points.

An attachment fixture may be used during attachment of the filament to the accessory, at its contact points. The fixture facilitates processing of a plurality of filament organizers at the same time. An attachment fixture comprises a base plate including a plurality of organizer slots and having a first end and a second end. A first support is secured to the first end and a second support is secured to the second end. The fixture includes at least one rod extending between the first support and the second support to contact each of the plurality of filament organizers positioned in each of the plurality of organizer slots. A rod may be made of a conducting material that acts as a heating element to assist with elevated temperature bonding of a filament to contact points of the accessory.

Definitions

The term "filament" as used herein refers to a threadlike structure particularly an optical fiber and related optical waveguides, including those having a refractive index grating or Bragg grating formed therein.

The term "thermal compensator" means an accessory for attachment to a filament, particularly an optical fiber that includes a Bragg grating, to provide a temperature compensated Bragg grating, which maintains a target wavelength independent of temperature variation.

The term "filament organizer" refers to an article for convenient containment and handling of extended lengths of filament, particularly optical fiber, during processing. A filament organizer according to the present invention includes a movable mini-tray as an accessory positioner.

The term "accessory positioner" describes a movable, detachable portion of a filament organizer. An accessory positioner includes at least a pair of spaced-apart spools for holding a filament and to allow access to a section of filament during processing of a filament.

The term "tuning jig" refers to a device used for adjusting a temperature compensated optical fiber Bragg grating to a target, tuned wavelength.

The term "attachment fixture" is used to describe an apparatus that may be used with one or more filament organizers to facilitate attachment of an accessory to a filament.

The term "proofing" applies to a filament in the form of an optical fiber containing a Bragg grating and means the process of monitoring optical properties during thermal cycling to confirm attainment of target values of e.g. optical fiber Bragg grating wavelength response within a prescribed temperature range.

The term "proofing fixture" refers to an apparatus that may be used with one or more accessory positioners during proofing and related evaluation of the properties of one or more optical fiber Bragg gratings.

The term "tensioner" or "filament restrictor" describes a device or structure used with a filament containment assembly, e.g. a pair of spools, to restrain a filament so that it does not become slack.

The term "fiber tensioning" refers to the process of attaching a weight or applying tension to a section of filament to place the filament under strain. Fiber tensioning of an optical fiber precedes fiber-modifying operations such as the writing of a Bragg grating in the fiber and attachment of a thermal compensator to the optical fiber.

The term "coupled" indicates the existence of intervening parts in an attachment structure.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF THE PREFERRED AND OTHER EMBODIMENTS

A filament organizer according to the present invention provides a means for attaching an accessory to a filament. In its preferred embodiment the filament organizer facilitates precise, reproducible assembly of tunable, temperature-compensated fiber Bragg grating packages.

Figure 1:
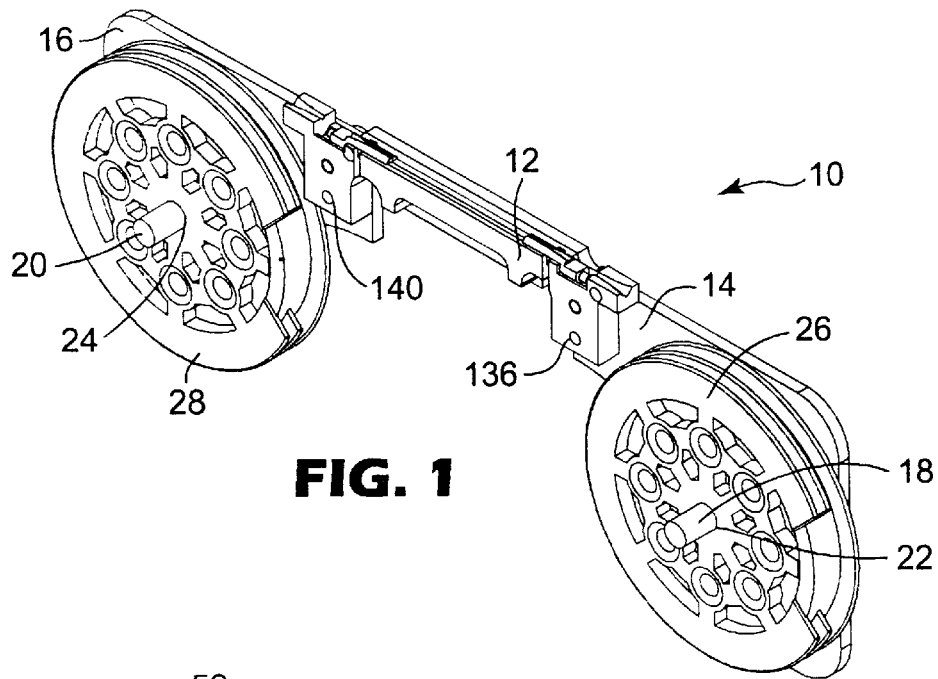
FIG. 1 provides a perspective view of an accessory positioner according to the present invention.

Referring now to the Figures wherein like numerals refer to like parts throughout the several views, FIG. 1 shows an accessory positioner 10 that includes an accessory cradle 12 connecting a first plate 14 to a second plate 16. The first plate 14 has a first axle 18 and the second plate 16 has a second axle 20 connected at a surface of each of the first plate 14 and the second plate 16. The first axle 18 engages a first hub 22 of a first spool 26 and the second axle 20 engages a second hub 24 of a second spool 28. The spools 26, 28 act as storage devices for a length of filament (not shown) extending between them 26, 28. Each hub 22, 24 of the first spool 22 and the second spool 24 has a diameter slightly less than the diameter of each of the first axle 18 and the second axle 20 to provide a friction fit between each axle 18, 20 and hub 22, 24. Friction between these parts restricts rotational movement between an axle 18, 20 and a hub 22, 24. A filament wound between the first 26 and second 28 spools exists under slight tension due to frictional forces that restrict rotation of a spool 26, 28 about an axle 18, 20. Without further modification of the accessory positioner 10, a filament will pass over the accessory cradle 12 so that there is alignment of the filament axis to the longitudinal axis of the accessory cradle 12. With this alignment, a filament will also extend along the length of an accessory 56 placed in the accessory cradle 12.

As an alternative to the separated first 14 and second 16 plates shown in FIG. 1 the accessory cradle 12 could be attached to a single plate having axles on its surface to engage the hubs of spools, as described above. In this case, Other aspects of an accessory positioner 10 for filament storage and the use of frictional restriction to apply tension to a filament would remain as before.

Figure 2:
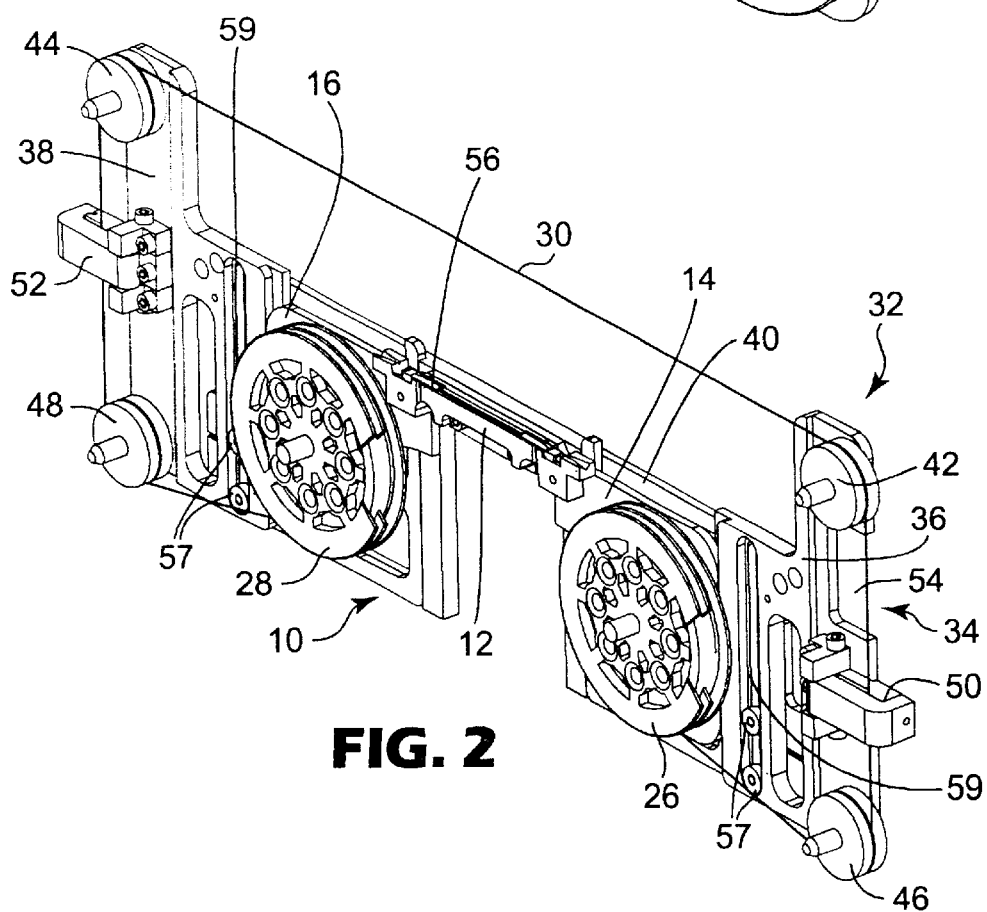
FIG. 2 shows a perspective view of a filament organizer according to the present invention including a positioner located at a first position.

FIG. 2 shows an accessory positioner 10 mounted between opposing ends 36, 38 of a frame 34 that is held together by a connecting structure 40 between the opposing ends 36, 38. The frame 34, has a plurality of guides including a first 42, and a second 44 forward guide, and a first 46 and a second 48 rear guide for threading a filament 30 from the first spool 26 to the second spool 28, when the accessory positioner 10 is mounted on the frame 34. Each of the opposing ends 36, 38 of the frame 34 includes a filament clamp 50, 52 for isolating a section of a filament 30 between the filament clamps 50, 52. At least one of the opposing ends 36, 38 includes a notch 54 that the filament 30 traverses between a forward guide 42, 44 and a filament clamp 50, 52. The notch 54 provides access to a filament 30 to allow application of weighted tension that produces a selected force acting on the section of filament 30 between the forward guides 42, 44.

The configuration illustrated in FIG. 2 provides a filament organizer 32 in which there is separation between the accessory cradle 12 and the filament 30. This places the accessory positioner 10 in its retracted position allowing an accessory 56 to be placed in the accessory cradle 12. The method of mounting the accessory positioner 10 in the frame 34 provides movement between them so that the position of the accessory positioner 10 is adjustable inside the frame 34. Any one of a number of known methods may be used to provide movement between an accessory positioner 10 and a frame 34 of a filament organizer 32 according to the present invention. Such methods include the use of a T-slot, V-slot, dovetail, ball and groove configuration, linear ball slide, rack and pinion system, three or four bar linkage, cams, hinges, or pneumatic or mechanical actuators (for automated use). FIG. 2 shows a preferred method of mounting an accessory positioner 10 on a frame 34. In this case, the connecting structure 40 joins the frame end plates 36, 38 together using connecting studs 57 on the connecting structure 40 movably retained in grooves 59 formed in each end plate 36, 38. The connecting structure 40 has movement forwards or rearwards that is limited by the positioning of the studs 57 in each groove 59. As indicated in the previous description, the connecting structure 40 may move to a variety of positions limited only by the length of the grooves 59 and the position of studs 57 located within each groove 59. Movement of the connecting structure 40 imparts movement to an accessory positioner 10 detachably mounted on the connecting structure 40. Detachable mounting of an accessory positioner 10 to a connecting structure 40 may use any of a number of attachment components including screws, nut and bolt combinations and related mechanical fasteners.

Figures 3, 4:
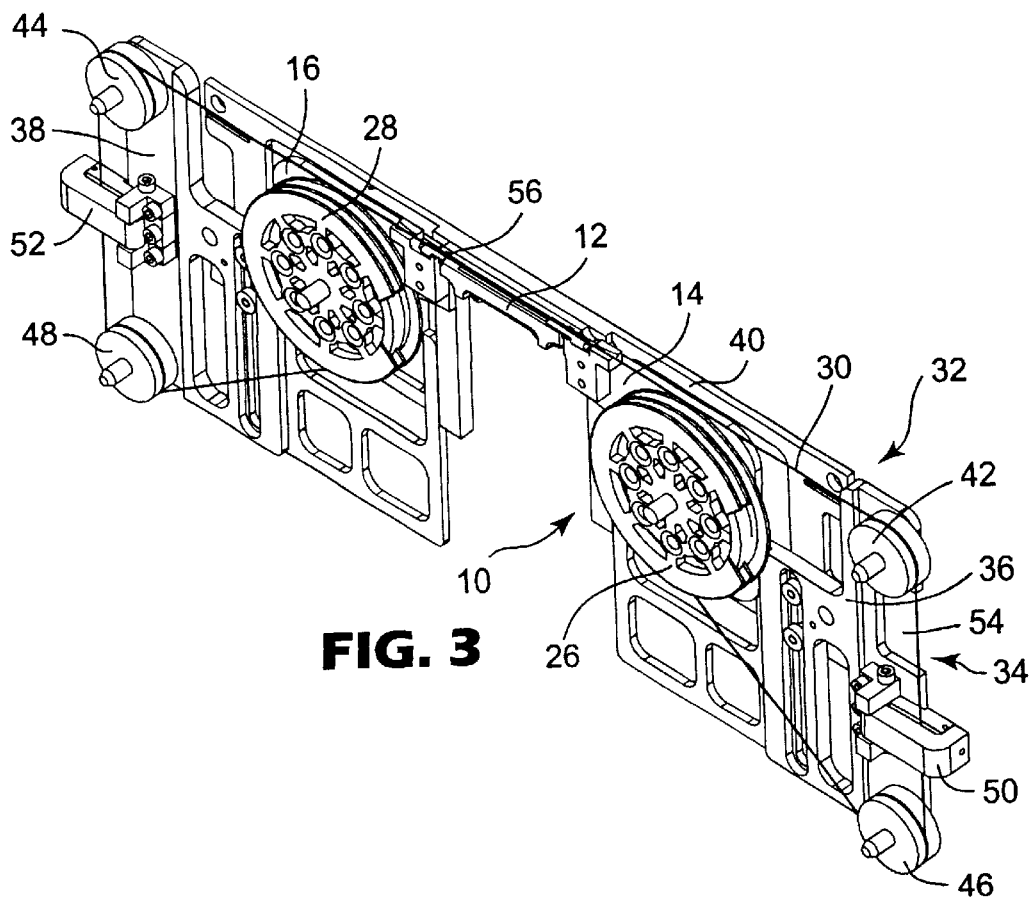
FIG. 3 shows a perspective view similar to that of FIG. 2 except for the locating of a positioner in a second position relative to a filament organizer according to the present invention.
FIG. 4 is a perspective view of an accessory, described herein as a thermal compensator, for stabilizing an optical fiber Bragg grating over a range of temperatures.

Comparison of FIG. 3 with FIG. 2 shows the change between optional locations of an accessory positioner 10 mounted on a connecting structure 40. An accessory 56 inserted in the accessory cradle 12 of an accessory positioner 10, in its retracted position, may be moved into a proximate position near to the section of filament 30, as shown in FIG. 3. During movement of the accessory positioner 10 the rear guides 46, 48 act against the frictional forces between the axles 18, 20 and hubs 22, 24, causing the spools 26, 28 to rotate. This releases filament 30 from each spool 26, 28 thereby allowing the accessory positioner 10 to move from the retracted position to the proximate position. In this way, there is an increase in the length of a filament 30 between a spool 26, 28 and a rear guide 46, 48, while the section of filament 30, between the filament clamps 50, 52 remains unchanged. From the proximate position of an accessory positioner 10, an accessory 56 may become attached to the approximate center of the section of filament 30. After attachment of an accessory 56 to the section of filament 30 the accessory positioner 10 may be removed to the retracted position. A biasing means such as a spring or cam may be used to rotate the spools 26, 28 to readjust the filament 30 between the spools 26, 28 and the rear guides 46, 48 to their shorter lengths.

A preferred filament 30 is an optical fiber that includes a Bragg grating to provide an optical signal within a prescribed wavelength envelope. Variation of temperature is known to cause wavelength drift of an optical fiber Bragg grating. This may be overcome using an accessory 56 for an optical fiber Bragg grating that compensates for temperature variation. Such an accessory 56 is referred to herein as a thermal compensator.

FIG. 4 shows an accessory 56 in the form of a thermal compensator including a cylindrical ceramic rod 60, preferably a quartz rod, that allows a first end cap 62, and a second end cap 64 to slide to selected positions along its length. Any of a variety of securing means may be used to retain the end caps 62, 64 in the selected positions at opposing ends of the ceramic rod 60. Suitable securing means include mechanical bonding, or bonding using adhesives, low melting glasses, and metal solders. The length of a thermal compensator is about 10 cm. or less which is also the length of the rod 60.

It is known that effective thermal compensation of optical fiber Bragg gratings depends on constructing a thermal compensator that balances the thermal expansion characteristics of materials used for its construction. Typically, the balance is established according to precise dimensional and positional relationships between materials having a low coefficient of thermal expansion (CTE) and materials having a high CTE. During temperature variation the length and strain characteristics of a temperature-compensated optical fiber Bragg grating will stay essentially unchanged, provided that the thermal compensator components have the correct dimensions and positional relationships.

Using a filament organizer, as illustrated in FIG. 2 and FIG. 3 it will readily be appreciated how a thermal compensator, placed in an accessory cradle 12, may be moved from the retracted position to the proximate position of the accessory positioner 10. Adjustment of the proximate position of the accessory positioner 10 in a filament organizer 32 according to the present invention brings a thermal compensator into precise alignment and contact with an optical fiber, i.e. the filament 30. Alignment of an accessory 56, such as a thermal compensator, to an optical fiber precedes the actual attachment of a thermal compensator to an optical fiber 30. Attachment of an optical fiber 30 to a thermal compensator uses a first cantilever 68 extending from the first end cap 62 and a second cantilever 70 extending from the second end cap 64. A first contact point 72 on the first cantilever 68 and a second contact point 74 on the second cantilever 70 provide points on the thermal compensator to which a fiber 30 under tension, between first 50 and second 52 filament clamps may be firmly attached (see FIG. 6). A number of available means for firmly attaching an optical fiber 30 to the cantilevers 68, 70 includes mechanical bonding or bonding using epoxy adhesives, low melting glasses, metal solders and the like.

The process for attaching an optical fiber 30 to a thermal compensator benefits from the precise alignment of a section of an optical fiber 30 with a thermal compensator, using an accessory positioner 10 according to the present invention. After establishing correct alignment, the section of optical fiber 30 between the filament clamps 50, 52 requires the application of a prescribed tension. The desired load may be applied to the section of optical fiber 30 by weighting the optical fiber 30 in the notch 54 of the accessory positioner 10. A free weight or related fiber tensioning device, e.g. a force or chatillon gauge, may be used to place a desired load on the optical fiber 30. Preferably a section of fiber 30, between filament clamps 50, 52, exists under a positive load.

The applied load may be in a range from about 1 g to about 50 g, preferably from about 5 g to about 20 g.

A temperature compensated optical fiber package requires attachment of an optical fiber 30 to a thermal compensator during the application of the prescribed load to the section of optical fiber 30 between the filament clamps 50, 52. In a preferred process, optical fiber 30 attachment requires heating of the thermal compensator and the optical fiber 30 to a temperature sufficiently high to cure a quantity of adhesive applied to the optical fiber 30 and the cantilevers 68, 70 at each of the contact points 72, 74. An adhesive drop, sufficient to bond an optical fiber 30 to a contact point 72, 74, represents a typical quantity of adhesive. Adhesive drops bond the optical fiber 30 to the cantilevers 68, 70 at the contact points 72, 74 during curing of the adhesive at elevated temperature. Preferably the adhesive is an epoxy adhesive, cured at approximately 100° C. for a period of about one (1) hour. Effective bonding of an optical fiber 30 to each cantilever 68, 70 of a thermal compensator may include slight separation between the optical fiber 30 and a cantilever 68, 70 to facilitate penetration of the adhesive into the interface between the optical fiber 30 and a cantilever 68, 70. Following bonding of an optical fiber 30 to a thermal compensator, the temperature compensated section of optical fiber 30 cools to ambient temperature with retention of the prescribed tension on the optical fiber 30 between the contact points 72, 74.

Figure 5:
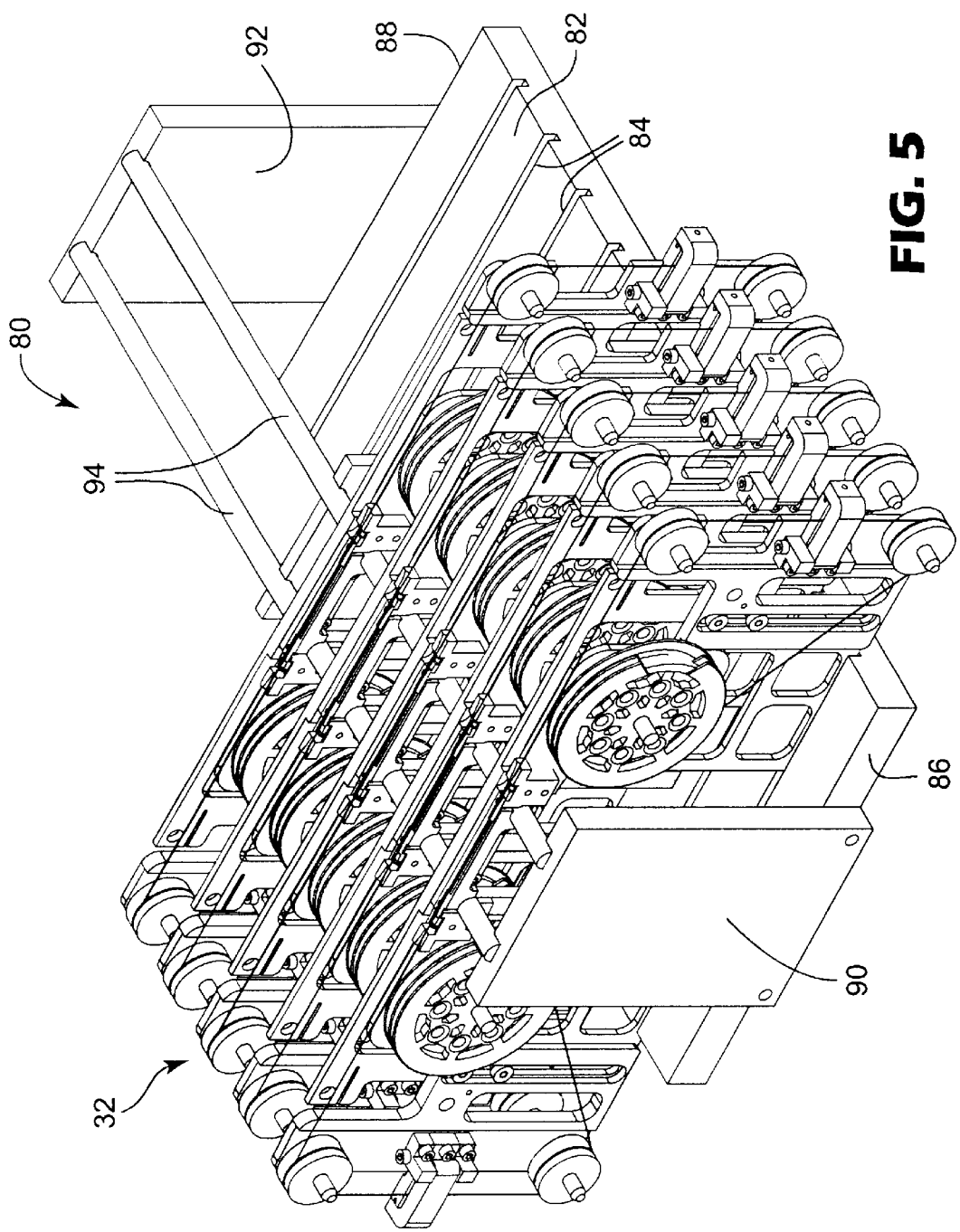
FIG. 5 is a perspective view showing a plurality of filament organizers positioned in an accessory attachment fixture to facilitate attachment of an accessory to a section of a filament.

FIG. 5 shows a plurality of filament organizers 32 arranged in an accessory attachment fixture 80. The fixture 80 comprises a base plate 82 having a plurality of organizer slots 84 corresponding to the number of filament organizers 32 contained within the accessory attachment fixture 80. The base plate 82 has a first end 86 including a first support 90 and a second end 88 having a second support 92. At least one rod 94 extends between the first support 90 and the second support 92. FIG. 5 includes two rods 94 positioned adjacent to each end of an accessory 56, preferably a thermal compensator, with the accessory positioner 10 in its proximate position. The thermal compensator accessory 56 is shown more clearly in FIG. 3 and FIG. 4. Preferably each rod 94 is electrically conducting and acts as a heating element to raise the temperature at the ends of thermal compensators positioned in each accessory cradle 12 and aligned with optical fibers contained by the filament organizers 32 in the accessory attachment fixture 80. The use of an accessory attachment fixture 80 provides a convenient way for attaching an accessory 56 to an optical fiber 30 in each of a plurality of filament organizers 32.

Attachment of thermal compensators to optical fibers 30, as previously described, may use an accessory attachment fixture 80 to simultaneously produce a number of thermally compensated optical fibers 30. Production of such thermally compensated structures under essentially the same conditions leads to optical devices with similar performance characteristics, depending on material consistency.

The previous general discussion, for attaching accessories to filaments, may be beneficially applied to the production of temperature compensated refractive index gratings 66, also referred to herein as a Bragg gratings. A stable periodic refractive index grating 66, free from wavelength drift, requires the preparation of a thermally compensated package 100 that positions a Bragg grating 66, under tension, between the contact points 72, 74 of a thermal compensator as shown in FIG. 6.

Methods for forming optical fiber Bragg gratings are well known as are means whereby gratings' packages may include temperature compensation, so as to provide a grating having a consistent wavelength response over a significant range of temperatures. The distinguishing feature of the present invention is the use of a filament organizer 32 with an accessory positioner 10 that allows repeated, precise positioning of an accessory 56 particularly, in this case, a thermal compensator, for attachment to an optical fiber section that contains a Bragg grating 66. Selected fixtures may be used with filament organizers 32 according to the present invention. An accessory attachment fixture 80, as previously described, facilitates the bonding of an optical fiber 30 to contact points 72, 74 of a thermal compensator. This produces a thermally compensated optical fiber Bragg grating package 100.

Figure 6:
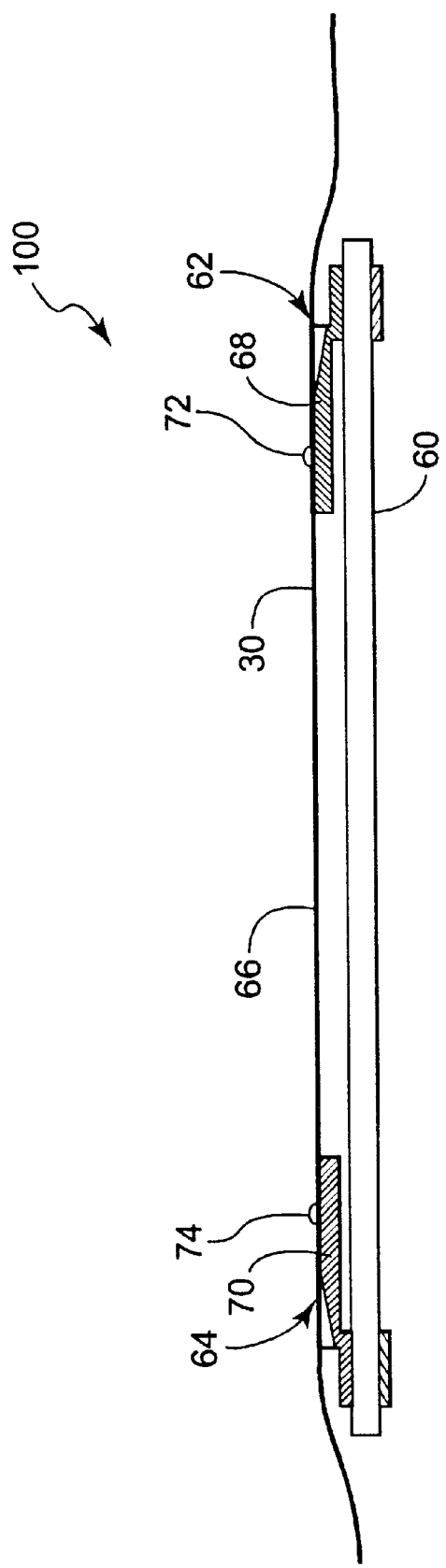
FIG. 6 provides a cross sectional view of an assembled optical fiber Bragg grating showing an optical fiber attached to a thermal compensator.

FIG. 6 illustrates the construction of an optical fiber Bragg grating package 100 that includes a thermal compensator comprising a rod 60, such as a quartz rod, having end caps 62, 64 at each of its opposing ends. The end caps include cantilevers 68, 70 extending towards the center of the rod 60. Using a filament organizer 32 that includes an accessory positioner 10, the thermal compensator aligns with an optical fiber 30 when the accessory positioner 10 is in its proximate position. This allows attachment of the optical fiber 30 to the thermal compensator, as previously described, to produce the structure shown in FIG. 6 having an optical fiber Bragg grating 66 bonded between the contact points 72, 74 on the cantilevers 68, 70 of the end caps 62, 64.

After formation of optical fiber Bragg grating packages 100, filament organizers 32 are removed from the accessory attachment fixture 80 and disassembled by removing the accessory positioner 10 from each frame 34. Optical fiber 30 containment between the first spool 26 and second spool 28 may require rotation of the spools 26, 28 to wind in the length of optical fiber 30 previously extended over the forward 42, 44 and rear 46, 48 guides of the filament organizer 32. The process of winding in excess optical fiber 30 places the optical fiber Bragg grating package 100 in the accessory cradle 12 in preparation for thermal cycling and proofing the package 100. Thermal cycling of an optical fiber Bragg grating package 100 occurs within a temperature range from −40° C. to 80° C. Proofing includes monitoring light signals within an optical fiber Bragg grating, during thermal cycling, to determine the operating characteristics, particularly the wavelength, of an optical fiber Bragg grating package 100.

Figure 7:
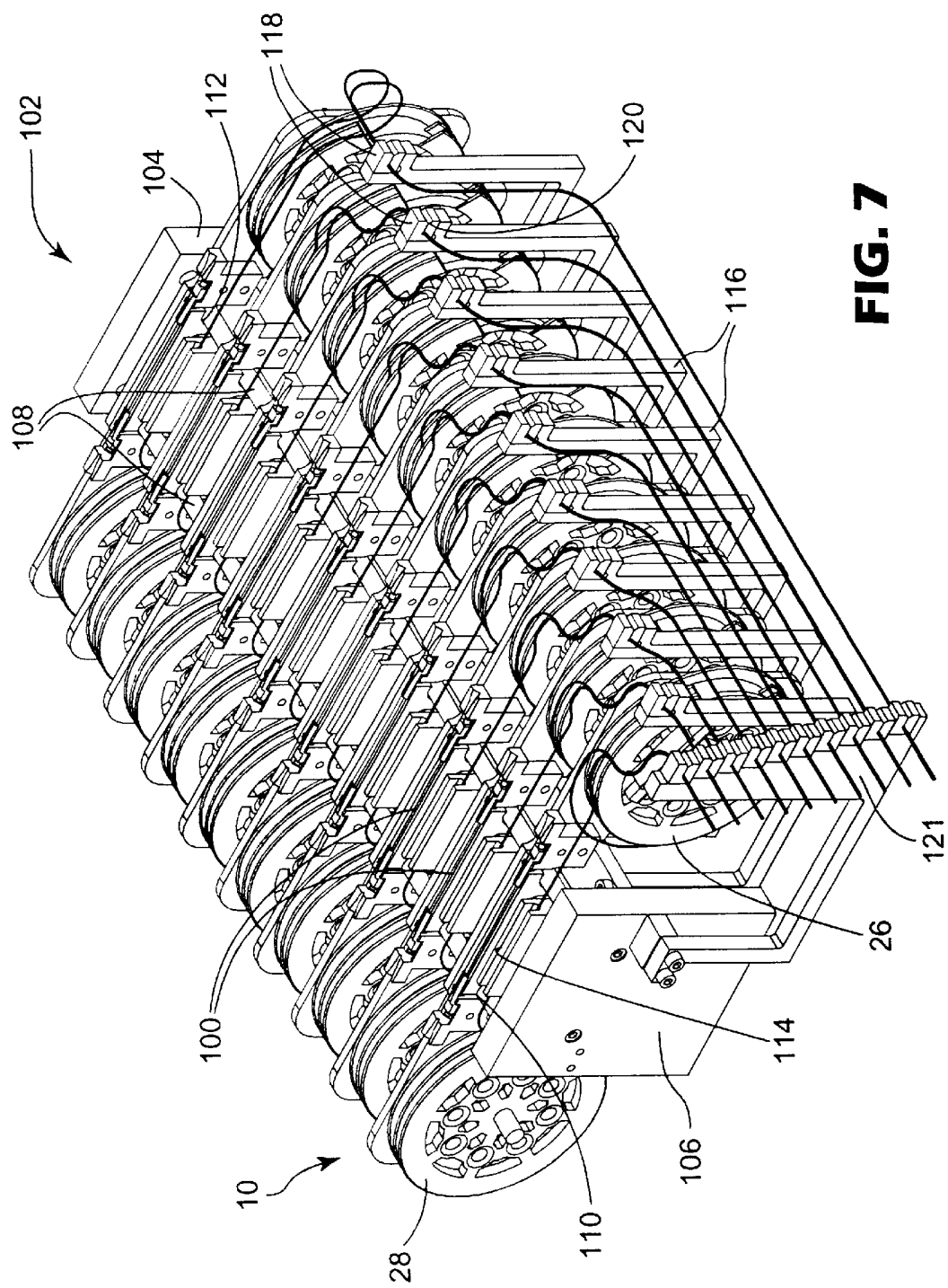
FIG. 7 provides a perspective view showing a plurality of accessory positioners in an optical proofing fixture according to the present invention.
Figure 8:
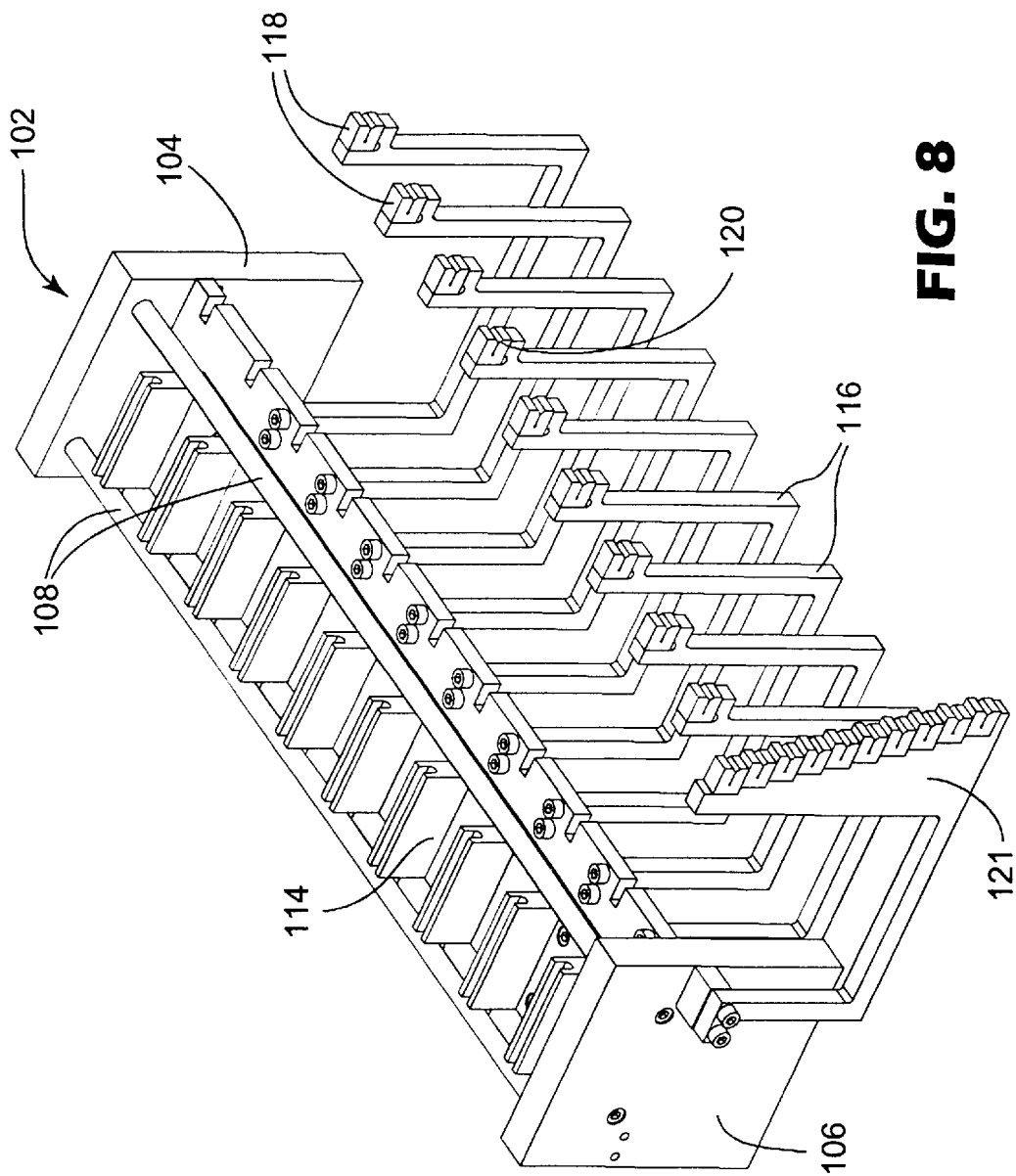
FIG. 8 shows a perspective view of an optical proofing fixture.

FIG. 7 shows an optical proofing fixture 102, used during thermal cycling and evaluation of a number of optical fiber Bragg grating packages 100 arranged in the fixture 102. The optical proofing fixture 102 includes a first face plate 104 and a second faceplate 106 at either end of a pair of support bars 108 for engaging a first indent 110 and a second indent 112 formed in the accessory cradle 12 of each accessory positioner 10. When each accessory positioner 10 has been seated in the optical proofing fixture 102, a pigtail section of optical fiber 30 is unwound from each spool 26, 28. The pigtail sections of optical fiber 30 allow connection of each optical fiber Bragg grating package 100 to an optical spectrum analyzer so as to monitor the wavelength of each grating 66 during thermal cycling and property evaluation. An optical proofing fixture 102 according to the present invention includes pigtail organizing components including a pigtail channel 114 to direct optical fiber pigtails from the second spool 28, over the support bars 108, towards the first spool 26. In the vicinity of each first spool 26, the optical proofing fixture 102 includes a pigtail mount 116 that has a pigtail grip 118 to receive pigtail ends from both the first spool 26 and the second spool 28. Each pigtail grip 118 comprises a resilient material, preferably a polymeric foam, having a retention slit 120 formed in the resilient material. The retention slit 120 associated with each accessory positioner 10 holds a pair of pigtail ends for positioning according to the height of the pigtail mount 116. Pigtail grips 118 arranged in a common plane, as shown in FIG. 7, provide organization of optical fiber pigtails that may be transformed into a parallel array using a stepped organizer 121. A parallel array may also be achieved in the absence of a stepped organizer 121 by changing the heights of pigtail mounts 116 to provide a stepped relationship between pigtail grips 118. The parallel-array fiber organizing scheme, while not limiting, provides a convenient arrangement of optical fiber pigtails for connection to an optical spectrum analyzer. FIG. 8 provides additional detail of an optical proofing fixture before inserting accessory positioners 10. In this case the retention slits 120 have a horizontal orientation. Rotational repositioning of pigtail grips 118 to produce vertically orientated retention slits represents a possible alternative structure compared to the optical proofing fixture shown in FIG. 7 and FIG. 8.

After the processes of thermal cycling and proofing the optical fiber Bragg grating 66 exists under tension that was applied during the production of the package 100. It is known that the spectral wavelength of a periodic refractive index grating may be varied by changing the amount of tension applied to the optical fiber 30 that is bonded between the contact points 72, 74 of the thermal compensator. Adjustment in tension applied to an optical fiber Bragg grating 66 provides a method for tuning the wavelength response of the grating.

During initial attachment of a fiber 30, to a thermal compensator, the Bragg wavelength setting is not critical, but preferably is lower than that desired of the final package 100. Subsequent adjustment and tuning of the wavelength of the Bragg grating 66 requires application of torsional force to the cantilevers 68, 70. During this process, the ends of the cantilevers 68, 70 are bent away from the surface of the rod 60 using an appropriate jig. This increases the distance between the cantilevers 68, 70, and the distance separating the optical fiber 30 from the rod 60. The increase in distance between the cantilevers 68, 70 raises the tension in the optical fiber 30 and adds to its length causing a change in the wavelength setting of the Bragg grating 66. The range of increase in length, required to provide a full range of tuning, for most applications, is typically less than 5 $\mu$m. The post tuning operation is preferably carried out at the temperature of operation of the device thereby providing a resulting optical fiber grating package 100 which operates at an accurate wavelength at any given temperature across an operating temperature range.

Although not requiring temperature compensation, some optical fiber Bragg gratings, e.g. those used in a constant temperature environment, may be packaged using the accessory 56 shown in FIG. 4 to provide a supporting structure for an optical fiber. In this case there is no need to set accessory dimensions to provide temperature compensation. However, the need may still exist for tuning the wavelength of a Bragg grating held by the accessory 56. The tuning method for a temperature compensated Bragg grating may also be applied to a similar optical fiber Bragg grating package designed for use in a constant temperature environment.

Post tuning an optical fiber grating package 100 according to the present invention is a computer controlled, automated process using an optical spectrum analyzer to compare the grating wavelength with a target wavelength. Deviations from the target wavelength may be overcome using a cantilever displacement mechanism to apply force to the cantilevers 68, 70 of the optical fiber grating package 100. The cantilever displacement mechanism responds to a computer-generated signal based upon the deviation of the grating 66 wavelength from the target wavelength.

Figure 9:
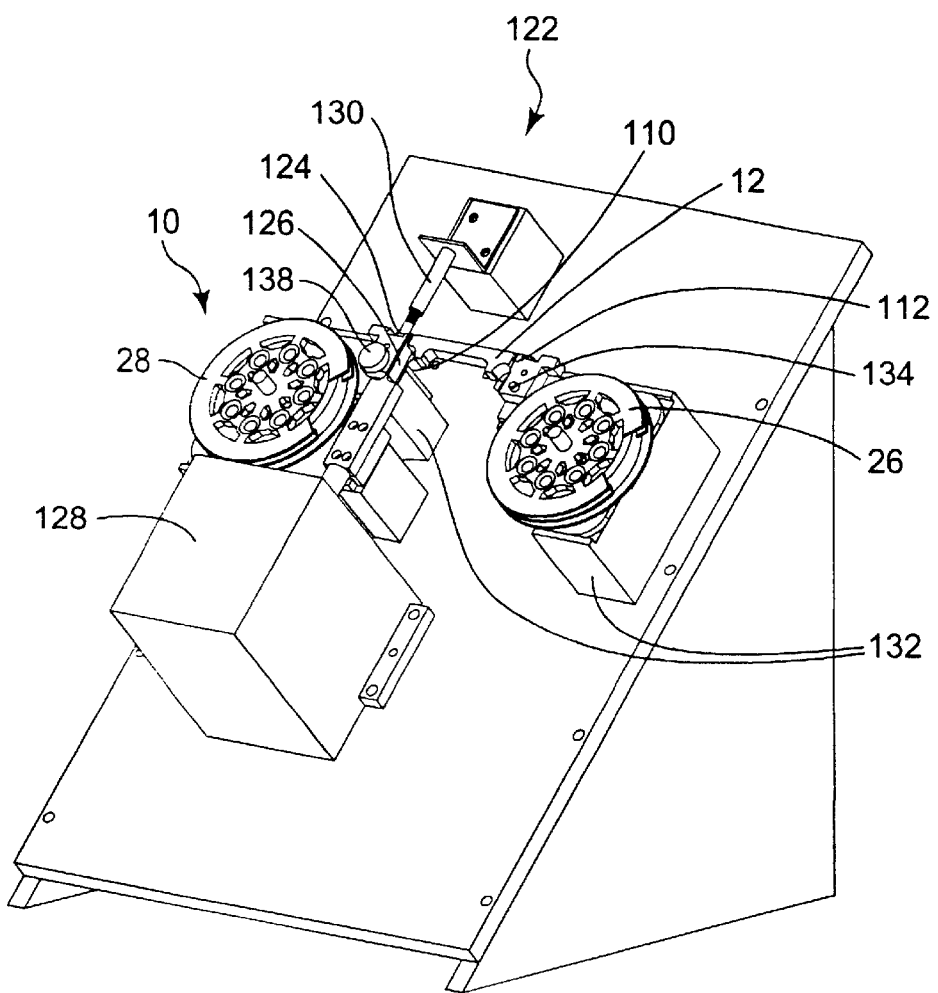
FIG. 9 is a perspective view of a tuning fixture for an optical fiber Bragg grating.

The automated tuning process provides rapid wavelength adjustment without operator intervention except to place an optical fiber Bragg grating package 100, retained in an accessory positioner, into a tuning jig 122. After making connection between the package 100 and an optical spectrum analyzer the operator designates the target wavelength to which the grating 66 should be tuned. Each optical fiber Bragg grating package 100 undergoes fine tuning of its wavelength using a grating tuning jig 122 shown in FIG. 9. Each accessory positioner 10 needs to be orientated to place a blade slot 124, formed in the accessory cradle 12, to receive an accessory tuning blade 126. Orientation includes setting the accessory positioner 10 to a selected height. In FIG. 9, the correct height is set using a pair of shaped blocks 132. One of the pair of shaped blocks 132 includes a locating pin 134 that fits in a positioning hole 136 in an accessory positioner (see FIG. 1). The other block 132 has a threaded opening (not shown) to receive a large-headed thumbscrew 138 that passes through a channel 140 in an accessory positioner 10 to secure the accessory positioner 10 to the block 132. Support means, other than shaped blocks 132, could be used to set the correct height and orientation of an accessory positioner according to the present invention. Therefore, support means used to attach accessory positioners 10 to tuning jigs 122 are not limited to those specifically illustrated herein.

The accessory tuning blade 126, of the tuning jig 122, enters or withdraws from the accessory positioner blade slot 124 under the control of a voice coil actuator 128. An accessory clamp 130 applies force to the end cap 64 to hold an optical fiber Bragg grating package 100 (not shown) in the accessory cradle 12 of an accessory positioner 10 during adjustment of a cantilever 70 that responds to force applied through the accessory tuning blade 126. This adjusts the length of the Bragg grating 66 as described previously.

Figure 10:
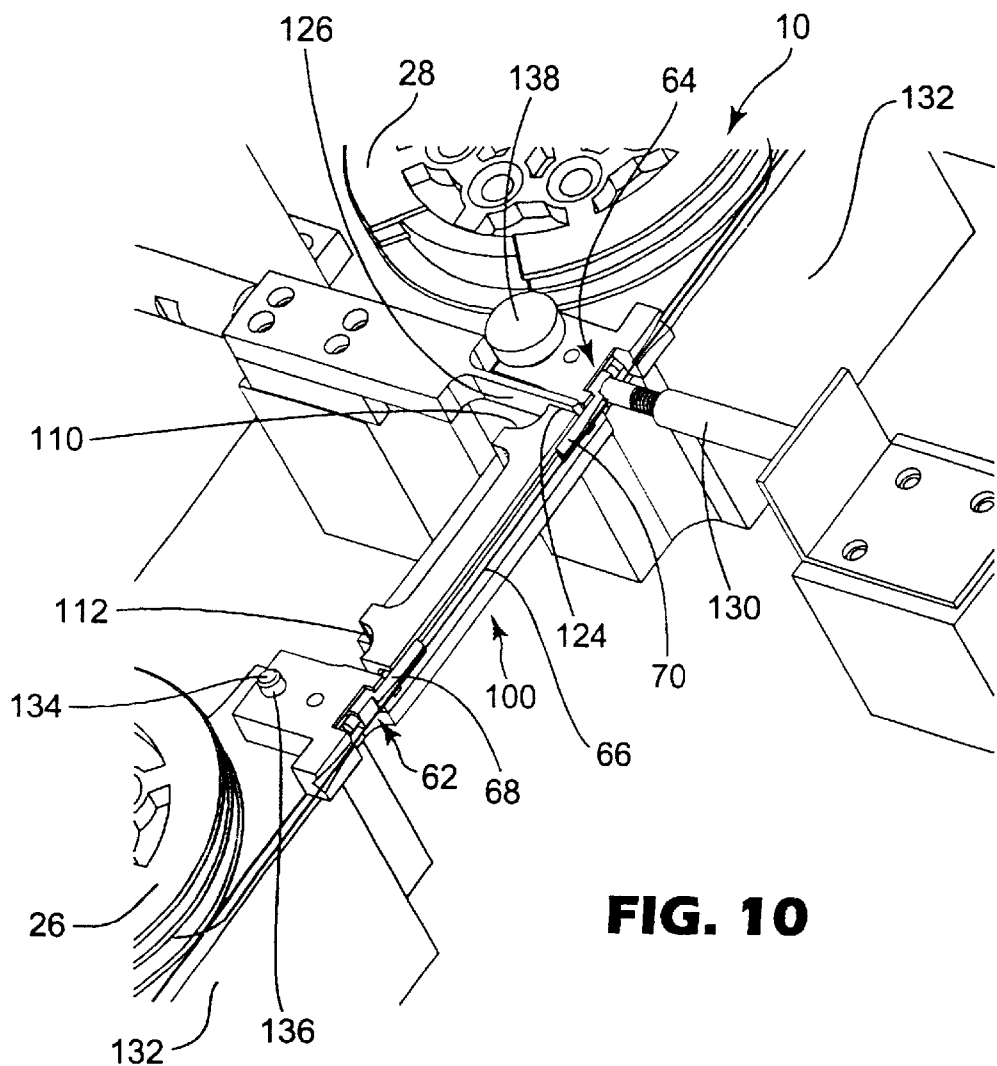
FIG. 10 provides a perspective view showing a portion of an accessory positioner engaged with operative parts of a tuning jig for an optical fiber Bragg grating package according to the present invention.

FIG. 10 provides a detailed view of the tuning jig 122 to clarify the process of precisely fine tuning a Bragg grating 66 to a target wavelength. Initially the pigtail ends of an optical fiber 30, held in an accessory positioner 10, are connected to a test system that includes a computer. Preferably the test system uses an optical spectrum analyzer and a light source. Other instruments known to those skilled in the art would also suffice.

Preparation for fine tuning the wavelength of a Bragg grating 66 entails mounting an accessory positioner 10, containing an optical fiber Bragg grating package 100, on a tuning jig 122. A suitably positioned accessory positioner 10 places the accessory cradle 12 to allow the tuning blade 126 to enter the blade slot 124. The tuning blade includes a pair of fingers (not shown) that pass around either side of the rod 60 of the grating package 100. Each finger touches an edge of a cantilever 70 on its underside. Without some form of restraint, the application of force to the underside of the cantilever 70 would push the grating package 100 out of the accessory cradle 12. An accessory clamp 130 prevents such an occurrence by applying a force to the end cap 64, from which the cantilever 70 extends. The starting position for Bragg wavelength adjustment therefore requires stabilization of the optical fiber Bragg grating package 100 in the accessory cradle 12 by contact of the accessory clamp 130 with the end cap 64. A computer controlled voice coil actuator then moves the tuning blade 126 into the blade slot until the fingers touch the underside of the cantilever 70.

Tuning the wavelength of a Bragg grating 66 to a target wavelength begins with input of the desired wavelength value into the computer of the test system. The computer probes the current wavelength of the Bragg grating 66 before comparing it with the target wavelength. Having determined the difference between the current wavelength and the target wavelength, the computer provides a signal to the voice coil actuator 128 to move the tuning blade 126 against the cantilever 70. The tuning blade 126 applies a force to the cantilever 70 which is typically made from a metal, preferably aluminum. This force, corresponding to the computer-generated signal, usually exceeds the elastic limit of the material, causing plastic deformation of the cantilever 70. Such plastic deformation repositions the cantilever 70 and introduces a permanent strain into the Bragg grating 66. Several test cycles may be used until the target wavelength is met. With each cycle the tuning blade produces a permanent bend in the cantilever 70. The permanence of the position of the cantilever 70 thereafter retains the Bragg grating 66 in a condition for dedicated operation at the target wavelength.

During precise fine tuning of Bragg gratings 66, according to the present invention, the advantageous use of a voice coil actuator 128 provides a linear output force corresponding to an input current that may be finely controlled. A high precision power supply with a voice coil actuator 128 produces a stable signal leading to an output force that is remarkably constant. This allows selection of a wide range of output force, limited only by the magnitude of energy transfer between a coil and a magnet. The output force of the actuator is proportional to the input current, similar to a DC motor. Cantilever 70 adjustment based upon a voice coil actuator 128 offers a precise, consistent and reliable method for fine control of force applied through the tuning blade 126.

A filament organizer including a movable accessory positioner has been described to show how an accessory may be attached to a filament. The filament organizer allows compact handling and transfer of filaments between various types of processing equipment. A filament organizer, as described previously, is particularly useful for mass producing multiple temperature compensated optical fiber Bragg gratings of substantially reproducible wavelength characteristics. Preferably a plurality of filament organizers is arranged in fixtures that facilitate the manufacture of performance consistent temperature compensated devices. Temperature compensated optical fiber Bragg grating packages according to the present invention may be individually tuned using a tuning apparatus controlled by a microprocessor. The use of special fixtures and tuning apparatus facilitates automation of at least parts of the process for manufacturing temperature compensated Bragg gratings, unlike previous similar processes that rely upon operator skill for correct fiber positioning and attachment of a thermal compensator.

As required, details of the present invention are disclosed herein; however, it is to be understood that the disclosed embodiments are merely exemplary. Therefore, specific structural and functional details disclosed herein are not to be interpreted as limiting, but merely as a basis for the claims and as a representative basis for teaching one skilled in the art to variously employ the present invention.

What is claimed is:

1. A filament organizer for attaching an accessory to a section of filament, said filament organizer comprising:
    a frame including a plurality of guides; and
    an accessory positioner mounted on said frame for movement between a first position and a second position, said accessory positioner including a first spool and a second spool having a filament extended therebetween to pass around said guides to locate said section of filament for attachment of an accessory thereto, said accessory positioner further having an accessory cradle to receive an accessory in said first position for transportation of an accessory to said second position for attachment to said section of filament.

2. The filament organizer of claim 1, wherein the filament is an optical fiber.

3. The filament organizer of claim 1, wherein said frame is a substantially rectangular frame, said plurality of guides including forward guides and rear guides.

4. The filament organizer of claim 3, having said section of filament located between said forward guides.

5. The filament organizer of claim 1, wherein said accessory positioner further includes a first surface opposite a second surface, a front edge, and a rear edge.

6. The filament organizer of claim 1, wherein the accessory is a thermal compensator.

7. A filament organizer for attaching an accessory to a section of filament, said filament organizer comprising:
    a substantially rectangular frame including a pair of forward guides and a pair of rear guides; and
    an accessory positioner mounted on said substantially rectangular frame, said accessory positioner having a first surface opposite a second surface, a front edge, a rear edge, a first spool adjacent said first surface between said front edge and said rear edge; a second spool adjacent said first surface between said front edge and said rear edge; a tensioner to apply a force to prevent slackening of a filament that passes from said first and second spools around said rear guides and said forward guides to locate a section of filament between said forward guides, said accessory positioner further having an accessory cradle at said front edge to move from a retracted position to a proximate position, said accessory cradle in said retracted position receiving an accessory for placement in axial alignment with said section of filament when said accessory cradle moves into said proximate position to attach said accessory to said section.

8. An accessory positioner comprising:
    a support;
    a first spool mounted for rotation on said support;
    a second spool mounted for rotation on said support and having a separation from said first spool for suspending therebetween a filament including a section of filament to locate said section of filament for attachment of an accessory thereto; and
    a filament restrictor to apply tension to the filament extending between said first spool and said second spool, said accessory positioner further having a accessory cradle to receive an accessory for attachment to said section of filament.

9. The accessory positioner of claim 8, wherein the filament is an optical fiber.

10. The accessory positioner of claim 8, wherein said support has a first surface opposite a second surface and a forward edge.

11. The accessory positioner of claim 10, wherein said support further includes a first hub having separation from a second hub said first and second hub, being attached to said first surface of said support.

12. The accessory positioner of claim 11, wherein said first spool engages said first hub and said second spool engages said second hub.

13. A process for attaching an accessory to a filament, said process comprising the steps of:
  providing a filament held in a filament organizer comprising:
    a frame including a plurality of guides; and
    an accessory positioner mounted on said frame for movement between a first position and a second position, said accessory positioner including a first spool and a second spool having a filament extended therebetween to pass around said guides to locate a section of filament for attachment of an accessory thereto, said accessory positioner further having an accessory cradle to receive said accessory in said first position for transportation of said accessory to said second position for attachment to said section of filament;
  placing said accessory positioner in said first position to insert said accessory in said accessory cradle, said accessory having a pair of spaced apart cantilever arms, each including a contact point;
  moving said accessory positioner into said second position placing said section of filament adjacent to said accessory for contacting said contact points; and
  bonding said accessory to said section of filament at each of said contact points.

14. The process of claim 13, wherein the filament is an optical fiber.

15. The process of claim 14, wherein said section of filament contains an optical fiber Bragg grating.

16. The process of claim 14, wherein said accessory is a thermal compensator.

17. The process of claim 13, wherein bonding said accessory to said section of filament includes bonding means selected from the group consisting of mechanical bonding, adhesive bonding, bonding with glass and bonding with solder.

* * * * *